May 19, 1936.  A. L. RUNYAN  2,041,490

RAILROAD CAR WHEEL OR OTHER WHEEL

Filed June 25, 1934

Inventor
Arthur L. Runyan
By Arthur F. Durand Atty.

Patented May 19, 1936

2,041,490

UNITED STATES PATENT OFFICE 2,041,490

RAILROAD CAR WHEEL OR OTHER WHEEL

Arthur L. Runyan, Chicago, Ill., assignor of one-half to Lewis H. Scurlock, Chicago, Ill.

Application June 25, 1934, Serial No. 732,263

5 Claims. (Cl. 295—11)

This invention relates to railroad car wheels, and more particularly to those that have rubber cushioning means incorporated in the structure thereof, in order to both reduce noise and afford smooth riding.

Generally stated, the object of the invention is to provide a novel and improved construction and arrangement whereby a rubber air cushion, in the form of an annular cellular ring, is interposed between the steel tread and the body of the car wheel, in a manner that will not only reduce noise and insure smoother riding, but which will also practically tend to insure against any breakage or distortion of the wheel, and consequent greater safety in the use of rubber cushioned wheels on railroad cars.

It is also an object to provide certain details and features of construction and combinations tending to increase the general efficiency and desirability of a cushioned railroad car wheel of this particular character.

To the foregoing and other useful ends, the invention consists in matters hereinafter set forth and claimed and shown in the accompanying drawing, in which—

Figure 1:
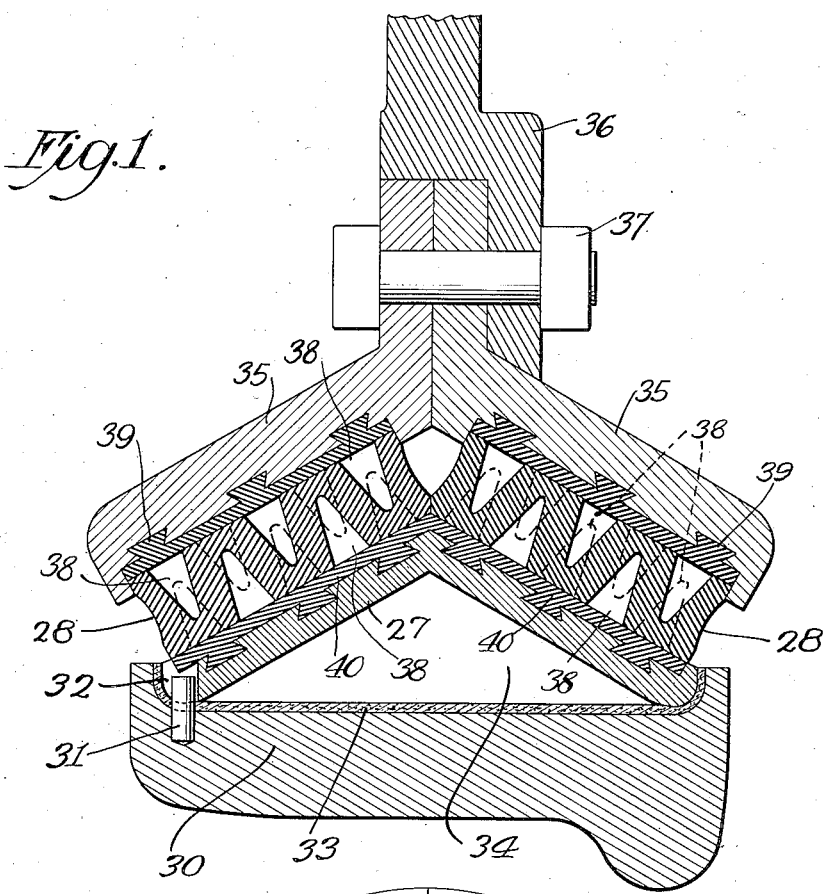
Fig. 1 is a cross section of the tread and cushion portions of a car wheel embodying the principles of the invention.
Figure 2:
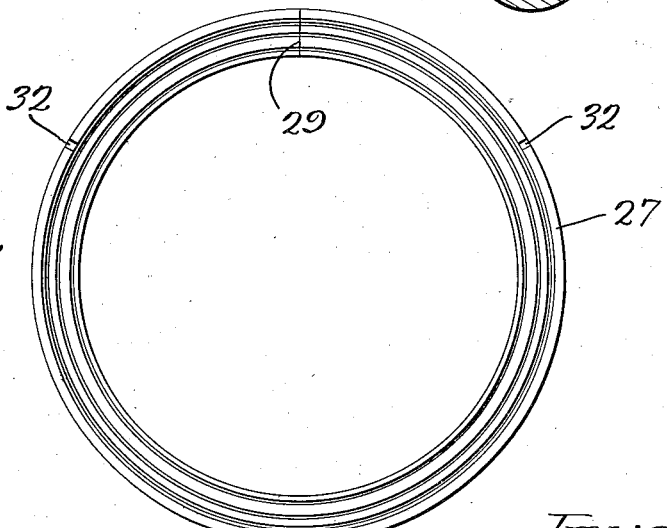
Fig. 2 is a side elevation of one of the elements of the construction shown in Fig. 1 of the drawing.

As thus illustrated, the invention comprises a separate metal ring 27 to which the cushions 28 are secured by vulcanizing thereto, this ring being split at 29 to facilitate assembling of the parts, and pins 31 are provided in the tire for engaging the notches 32 in the ring, so that the latter cannot rotate relatively to the tire or tread 30 of the wheel. Asbestos 33 is provided, on the inner periphery of the shoe or tread 30, and if desired the entire air space 34 formed between the ring 27 and the shoe or tread of the wheel may be filled with asbestos or other heat insulating material. In this way, if the brake shoes are applied to the tire or tread 30 of the wheel, any heat developed in the latter will be prevented from reaching the rubber cushions. The separable wheel sections 35 are disposed at the same angles as the side portions of the ring 27, so that the cushions 28 are held at angles, in the manner shown in Fig. 1 of the drawing. The wheel sections 35 are bolted to the wheel 36 by bolts 37, in a manner that will be readily understood.

The cells 38 of the cushions are arranged as shown, alternating with each other on opposite sides of each cushion, and the two cushions are vulcanized to the ring 27 and the sections 35 through the medium of the hard rubber strips 39 and 40, these strips having dovetailed ribs that engage the dovetailed grooves shown in the ring 27 and the sections 35, so that the rubber cushions are thoroughly and effectively anchored to the wheel and to the metal tire or tread. With the cushions arranged at angles, as shown, the rubber is in sheer, as it is called, and is subject to a sheering action, instead of a straight compressive action.

What I claim as my invention is:

1. In a vehicle wheel, a metal channel rim, means forming a metal tread or tire for the wheel, a rubber cushion in the form of an annular ring having inner and outer peripheries interposed between said rim and said tread, with the sides of the cushion exposed, said cushion having sealed air cavities therein, and means vulcanized to the tire and the rim to seal the outer ends of said cavities, said tire means and rim having side flanges holding said cushion and sealing means against lateral displacement, comprising heat insulating means between the tire and the cushion.

2. In a vehicle wheel, a metal channel rim, means forming a metal tread or tire for the wheel, a rubber cushion in the form of an annular ring having inner and outer peripheries interposed between said rim and said tread, with the sides of the cushion exposed, said cushion having sealed air cavities therein, and means vulcanized to the tire and the rim to seal the outer ends of said cavities, said tire means and rim having side flanges holding said cushion and sealing means against lateral displacement, comprising a separate ring to which the cushion is secured, with a space between said ring and the tire, and means to prevent relative rotation between the ring and the tire.

3. In a vehicle wheel, a metal channel rim, means forming a metal tread or tire for the wheel, a rubber cushion in the form of an annular ring having inner and outer peripheries interposed between said rim and said tread, with the sides of the cushion exposed, said cushion having sealed air cavities therein, and means vulcanized to the tire and the rim to seal the outer ends of said cavities, said tire means and rim having side flanges holding said cushion and sealing means against lateral displacement, comprising a separate ring to which the cushion is secured, with a space between said ring and the tire, and means to prevent relative rotation between the ring and the tire, and heat insulating material in said space.

4. In a vehicle wheel, a channel rim, means forming a tread or tire for the wheel, and a rubber cushion in the form of an annular ring having inner and outer peripheries interposed between said rim and said tread, said cushion having sealed air cavities therein, a separate ring to which the cushion is secured, with a space between said ring and the tire, and means to prevent relative rotation between the ring and the tire.

5. In a vehicle wheel, a channel rim, means forming a tread or tire for the wheel, and a rubber cushion in the form of an annular ring having inner and outer peripheries interposed between said rim and said tread, said cushion having sealed air cavities therein, a separate ring to which the cushion is secured, with a space between said ring and the tire, and means to prevent relative rotation between the ring and the tire, and heat insulating material in said space.

ARTHUR L. RUNYAN.